United States Patent [19]

Zenz

[11] 4,260,298
[45] Apr. 7, 1981

[54] CONTROL OF SOLIDS DISCHARGE FROM PRESSURIZED VESSEL

[75] Inventor: Frederick A. Zenz, Garrison, N.Y.

[73] Assignee: The Ducon Company, Inc., Mineola, N.Y.

[21] Appl. No.: 40,004

[22] Filed: May 17, 1979

[51] Int. Cl.³ .............................................. B65G 53/40
[52] U.S. Cl. ..................................... 406/146; 406/195
[58] Field of Search ....................... 406/195, 175, 146; 34/10, 57 R, 57 A; 252/417; 414/217

[56] References Cited

U.S. PATENT DOCUMENTS

| | | | |
|---|---|---|---|
| 2,909,392 | 10/1959 | Rees et al. | 406/195 X |
| 2,943,994 | 7/1960 | McCain | 34/10 X |
| 2,978,279 | 4/1961 | Bergstrom | 406/195 X |
| 3,661,799 | 5/1972 | Cartmell | 406/195 X |
| 4,106,210 | 8/1978 | Jukkola | 34/10 |

Primary Examiner—Joseph E. Valenza
Assistant Examiner—Gene A. Church
Attorney, Agent, or Firm—Seidel, Gonda, Goldhammer & Panitch

[57] ABSTRACT

Control of discharge of particulate solids from a pressurized vessel is attained through a downwardly directed conduit with or without the use of valves. The lower end of the conduit has a greater cross-sectional area than the upper end of the conduit. The lower end of the conduit may extend into a fluidized bed. Discharge of solids from the vessel may be controlled by controlling the height and degree of aeration of the fluidized bed.

6 Claims, 2 Drawing Figures

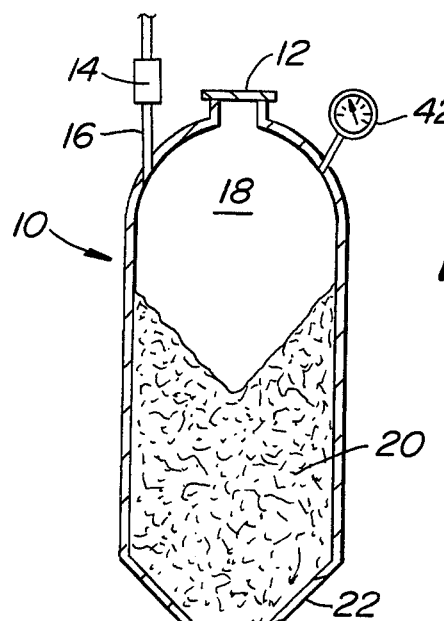
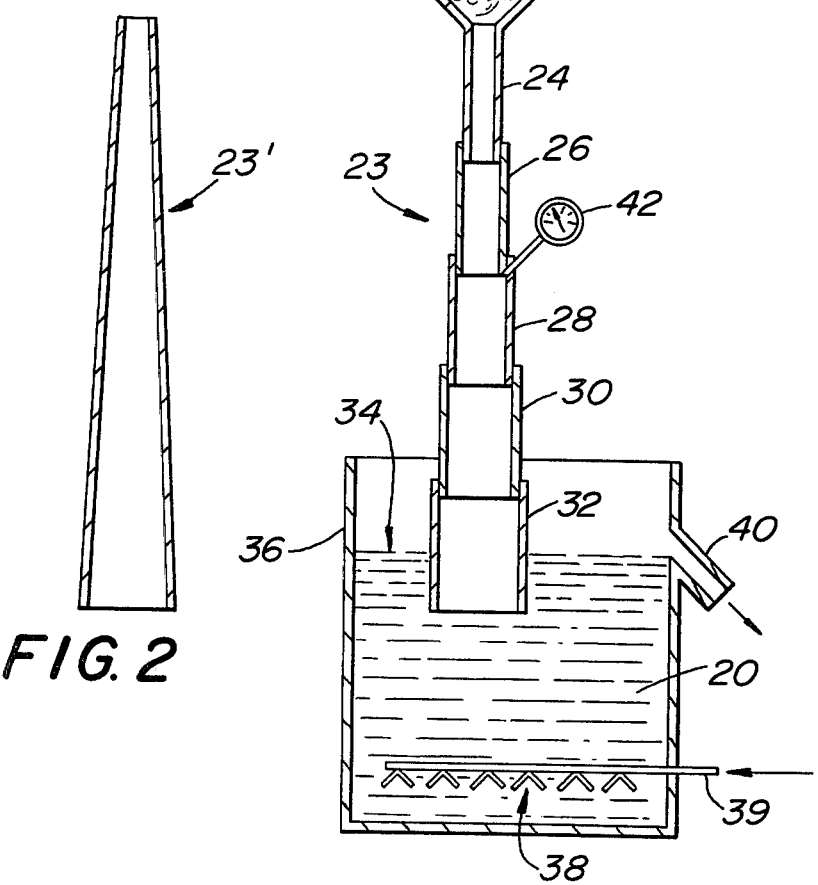
FIG. 1
FIG. 2

CONTROL OF SOLIDS DISCHARGE FROM PRESSURIZED VESSEL

BACKGROUND

There are numerous applications in the field of fluid bed reactors operating under pressure where it is desired to withdraw solids continuously to a lower pressure. Heretofore, control of such withdrawal has been by way of valved lock hoppers, riser pipes, etc. For example, see U.S. Pat. No. 4,106,210 which discloses discharge of solids through an upwardly directed riser pipe described as being of a tapered design to maintain uniform rates of flow.

One of the features of the present invention is the use of a downwardly directed conduit or standpipe of non-uniform cross-section. Per se, such a conduit is known from U.S. Pat. No. 2,943,994 for quenching the temperature of a gas and from U.S. Pat. No. 3,661,799 wherein the conduit is a petroleum cracking reactor.

SUMMARY OF THE INVENTION

The discharge of solids under pressure in a vessel is accomplished by way of a conduit communicating at one end with the lower end of the vessel and extending downwardly therefrom. The conduit is of non-uniform inner diameter with the cross-sectional area at the lower end of the conduit being greater than the cross-sectional area thereabove. The lower end of the conduit is associated with a control means for controlling the rate of discharge from said conduit. The control means preferably includes a fluidized bed wherein the height and degree of aeration of the bed is selectively variable. The fluidized bed has an outlet for discharge of solids introduced into the fluidized bed from said conduit.

It is an object of the present invention to provide for control of solids discharged from a pressurized vessel in a manner which is continuous, valveless, and controllable over a range such as 1 to over 1,000 tons per hour.

It is another object of the present invention to control solids discharge from a pressurized vessel by way of a downwardly extending conduit constructed so that the cross-sectional area of the conduit progressively increases to facilitate expansion and consequent reduction of pressure of interstitial gas while the solids are subjected to gravity and pressure from within the vessel.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a diagrammatic illustration of apparatus in accordance with the present invention.

FIG. 2 is a sectional view through an alternative construction for the conduit.

Referring to the drawings in detail, wherein like numerals indicate like elements, there is shown in FIG. 1 a vessel designated generally as 10. The vessel 10 at its upper end has a charge port to facilitate introducing solids 20 such as a catalyst or solid reactant into the chamber 18. The chamber 18 above the level of solids 20 in housing 36 may be pressurized by way of conduit 16 containing a pressure regulator valve 14.

The vessel 10 has a bottom portion 22 tapered at an angle corresponding generally to the angle of repose of the solids 20. The typical angle for the tapered portion 22 is about 70°. The tapered bottom portion 22 is in direct communication with the upper end of a discharge conduit designated generally as 23. The inner diameter of conduit 23 progressively increases in a downwardly direction. One inexpensive way of constructing such a conduit is to utilize a plurality of conduit portions 24, 26, 28, 30 and 32 having progressively larger inner diameters. The overlapped end portions of the respective conduit portions are welded to one another. In place of conduit 23, there is shown an alternative conduit designated 23' in FIG. 2. Conduit 23' is uniformly tapered so that the inner diameter progressively and continuously increases in a downward direction away from the vessel 10. It is understood that chamber 18 may represent in practice a vessel in which a process reaction is carried out under pressure. Examples of such would include fluidized iron ore reduction reactors, pressurized fluidized bed coal combustors, pressurized gas phase olefin polymerization reactors, etc.

The preferred embodiment of the present invention is to provide means for controlling the discharge of solids 20 from the lower end of conduit 23 or 23' without using a valve. One such means is shown in FIG. 1 wherein a fluidized bed 34 of solids 20 is provided within a housing 36. Housing 36 has an inner transverse dimension which is approximately four times the diameter of conduit portion 32. Bed 34 is fluidized by air or other gas which enters housing 36 by way of conduit 39 and the down shot grid 38. A down shot grid discharges the fluidized gas in a direction away from the surface of the fluidized bed 34. Housing 36 has an outlet 40 for discharge of solids 20 introduced into the bed 34 from the conduit 23. Suitable pressure gauges 42 may be provided where desired, such as the locations illustrated in FIG. 1.

The solids 20 may be intermittently or continuously and controllably discharged over a wide range of flow rates to over 1,000 tons per hour or more depending upon the size of the discharge conduit 23. The solids within the conduit 23 are subjected to gravity, to the force of the pressure within chamber 18 above the solids 20, and to the resulting condition wherein the interstitial air or other gas expands and loses pressure as such solids and interstitial air or other gas move downwardly through the conduit 23. The expansion of the interstitial gas has a cooling effect on the solids 20.

When the discharge from the lower end of the conduit 23 is controlled by a fluidized bed, the surface of the bed 34 should be above the lower end of the conduit 23 as illustrated in FIG. 1. If the height of the bed 34 and the degree of fluidization is kept constant, the rate of discharge from vessel 10 by way of the conduit 23 will likewise be constant. By varying the height of the bed 34 and the degree of aeration, the rate of discharge from the vessel 10 by way of the conduit 23 may be selectively varied over a wide range with reliable control. The present invention is capable of being used with a variety of different granular materials as the solids 20. Thus, the present invention may be used where the solids 20 have a mean particle size of 60 microns, a bulk density of 40 pounds per cubic foot, and a particle density of 80 pounds per cubic foot. These characteristics are by way of illustration and not by way of limitation.

The preferred embodiment of the conduit 23 or 23' requires that the cross-sectional area progressively increase in a downward direction away from the pressure vessel 10. The cross-sectional area may progressively increase in a continuous or step-wise manner. Any conventional discharge contrl means including a mechanical valve may be used. Even if the fluidized bed is used as the control means, the interstitial gas need not be completely depressurized.

In the drawing, the vessel 10 is only shown diagrammatically. Vessel 10 may include various paraphernalia, control devices, heating and/or cooling structure, etc. The upper end of the housing 36 may be open or closed as desired.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising a pressurized vessel adapted to contain solids under pressure, the lower end portion of said vessel being tapered toward a valveless discharge conduit, said discharge conduit communicating at its upper end with said vessel and extending downwardly from said vessel, said conduit having a cross-sectional flow area which increases in a direction away from said vessel so that solids and any interstitial gas in the conduit are progressively depressurized while solids are subject to gravity and pressure from within said vessel, and means associated with the lower end of said conduit for controlling the rate of discharge of solids from the lower end of said conduit.

2. Apparatus in accordance with claim 1 wherein said control means is a housing containing a fluidized bed the height and degree of aeration of which is selectively variable, said housing having an outlet for discharge of solids introduced into the fluidized bed from the lower end of said conduit.

3. Apparatus in accordance with claim 1 wherein said discharge conduit is provided with an inner cross-sectional area which gradually and progressively increases at a uniform rate from the upper end of the conduit to the lower end of the conduit.

4. Apparatus in accordance with claim 2 wherein said bed housing includes a down shot grid for introducing fluidizing air into the bed.

5. A method of removing solids from a pressurized vessel comprising the steps of:
    (a) providing a pressurized vessel containing solids and having a downwardly and inwardly tapered bottom end portion communicating directly with the upper end of a discharge conduit,
    (b) providing at least the lower end portion of said vessel with said solids with the space above the solids within the vessel being pressurized and with said conduit being filled with said solids,
    (c) controlling down flow of solids from the lower end of said conduit said conduit having a cross-sectional flow area which increases in a direction away from said vessel for progressively depressurizing interstitial gases along the entire length of said conduit as said solids and interstitial gases descend in said conduit and controlling discharge of solids at the lower end of said conduit while the solids in said conduit are subjected to the forces of gravity and the pressure above the solids in said vessel.

6. A method in accordance with claim 5 wherein said step of controlling discharge from the lower end of said conduit includes using a fluidized bed into which the lower end of said conduit extends so that sole control of discharge from said conduit in said bed is controlled by the height and degree of aeration of the fluidized bed.

* * * * *